United States Patent
Minamida

(10) Patent No.: US 10,840,548 B2
(45) Date of Patent: Nov. 17, 2020

(54) SOLID ELECTROLYTE LAMINATE AND ALL-SOLID-STATE BATTERY USING THE SAME

(71) Applicant: Toyota Jidosha Kabushiki Kaisha, Toyota (JP)

(72) Inventor: Yoshitaka Minamida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/372,538

(22) Filed: Apr. 2, 2019

(65) Prior Publication Data

US 2019/0305370 A1 Oct. 3, 2019

(30) Foreign Application Priority Data

Apr. 3, 2018 (JP) .................. 2018-071487

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| 2009/0087751 | A1 | 4/2009 | Kondo et al. |
| 2016/0261002 | A1* | 9/2016 | Trevey ............. H01M 4/628 |
| 2017/0098864 | A1 | 4/2017 | Ebisuzaki et al. |

FOREIGN PATENT DOCUMENTS

| JP | H10106627 A | 4/1998 |
| JP | 2009064645 A | 3/2009 |
| JP | 2017073201 A | 4/2017 |

* cited by examiner

*Primary Examiner* — Sarah A. Slifka
(74) *Attorney, Agent, or Firm* — Dinsmore & Shohl LLP

(57) ABSTRACT

A solid electrolyte laminate which can prevent a reduction in the discharge capacity of an all-solid-state battery despite the inclusion of an insulator such as alumina in the solid electrolyte laminate is disclosed. The disclosed solid electrolyte laminate includes a solid electrolyte and an insulator, wherein the solid electrolyte laminate has a multi-layer structure including a first low-insulator-content solid electrolyte layer, a high-insulator-content solid electrolyte layer, and a second low-insulator-content solid electrolyte layer laminated in this order. The content ratio of the insulator in each of the first and the second low-insulator-content solid electrolyte layer is lower than the content ratio of the insulator in the high-insulator-content solid electrolyte layer.

8 Claims, 2 Drawing Sheets

SOLID ELECTROLYTE LAMINATE AND ALL-SOLID-STATE BATTERY USING THE SAME

CROSS-REFERENCE TO RELATED APPLICATIONS

The present application claims priority to Japanese Patent Application No. 2018-071487 filed on Apr. 3, 2018, the entire contents of which are hereby incorporated by reference.

FIELD

The present disclosure relates to a solid electrolyte laminate and an all-solid-state battery using the same.

BACKGROUND

In recent years, all-solid-state batteries in which the electrolytic solution is replaced with a solid electrolyte have attracted attention. As a result, development related to solid electrolyte layers has been actively conducted.

For example, Patent Literature 1 discloses a lithium battery comprising a separator composed of an electrically insulating sheet having a plurality of through-holes and a solid electrolyte filled in these through-holes.

Furthermore, many efforts are being made to improve the functionality of solid electrolyte layers by adding alumina, which is an insulator, to the solid electrolyte layer. For example, Patent Literature 2 discloses a technology in which internal short circuiting can be prevented by adding alumina particles to a solid electrolyte layer. Further, Patent Literature 3 discloses a technology in which alumina is mixed into a sulfide lithium ion conductive solid electrolyte to improve the ionic conductivity thereof.

CITATION LIST

Patent Literature

[PTL 1] Japanese Unexamined Patent Publication (Kokai) No. Hei 10-106627
[PTL 2] Japanese Unexamined Patent Publication (Kokai) No. 2017-73201
[PTL 3] Japanese Unexamined Patent Publication (Kokai) No. 2009-64645

SUMMARY

Technical Problem

As described above, including alumina, which is an insulator, in a solid electrolyte laminate is studied.

However, when an insulator such as alumina is included in a solid electrolyte laminate depending on the content thereof, the internal resistance of the all-solid-state battery increases, whereby overvoltage increases. As a result, the discharge capacity of the all-solid-slate battery may be reduced.

The present disclosure was made in light of the above problems and aims to provide a solid electrolyte laminate which can prevent a reduction in the discharge capacity of an all-solid-state battery even if an insulator such as alumina is included therein.

Furthermore, the present disclosure aims to provide an all-solid-state battery including a solid electrolyte laminate as described above.

Solution to Problem

The inventor of the present disclosure has discovered that the above problems can be solved by the following means.
<Aspect 1>
A solid electrolyte laminate, comprising a solid electrolyte and an insulator,
wherein the solid electrolyte laminate has a multi-layer structure comprising a first low-insulator-content solid electrolyte layer, a high-insulator-content solid electrolyte layer, and a second low-insulator-content solid electrolyte layer laminated in this order, and
wherein the content ratio of the insulator in each of the first and the second low-insulator-content solid electrolyte layer is lower than the content ratio of the insulator in the high-insulator-content solid electrolyte layer.
<Aspect 2>
The solid electrolyte laminate according to aspect 1, wherein the content ratio of the insulator in each of the first and the second low-insulator-content solid electrolyte layer is 0.9 times or less of the content ratio of the insulator in the high-insulator-content solid electrolyte layer.
<Aspect 3>
The solid electrolyte laminate according to aspect 1 or 2, wherein the insulator comprises metal oxide particles.
<Aspect 4>
The solid electrolyte laminate according to aspect 3, wherein the metal oxide particles are alumina particles.
<Aspect 5>
The solid electrolyte laminate according to aspect 1 or 2, wherein the insulator comprises a binder.
<Aspect 6>
The solid electrolyte laminate according to any one of aspects 1 to 5, wherein the solid electrolyte comprises a sulfide solid electrolyte.
<Aspect 7>
An all-solid-state battery, comprising one or more all-solid state unit cells in winch a positive electrode current collector layer, a positive electrode active material layer, the solid electrolyte laminate according to any one of aspects 1 to 6, a negative electrode active material layer, and a negative electrode current collector layer are laminated in this order.
<Aspect 8>
The all-solid-state battery according to aspect 7, wherein the all-solid-state battery is a lithium ion secondary battery.

Advantageous Effects

According to the solid electrolyte laminate of the present disclosure, a reduction in the discharge capacity of an all-solid-state battery can be prevented despite the inclusion of an insulator such as alumina therein. Thus, for example, according to the solid electrolyte laminate of the present disclosure, a reduction in the discharge capacity of an all-solid-state battery can be prevented while receiving the benefits of including an insulator such as alumina in the solid electrolyte laminate.

DETAILED DESCRIPTION

Figure 1:
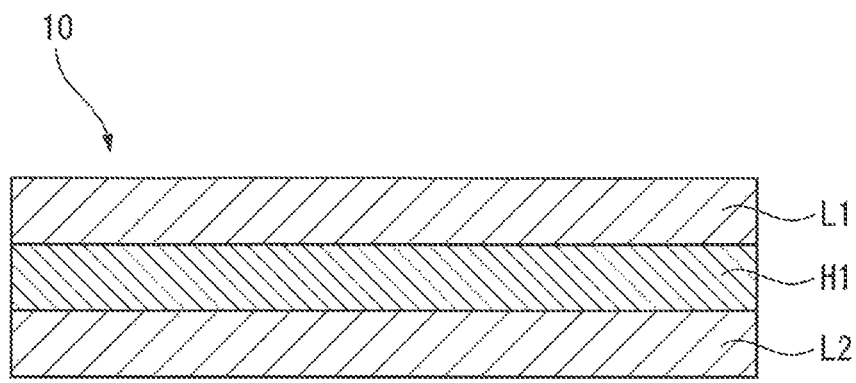
FIG. 1 is a schematic cross-sectional view showing an embodiment of the solid electrolyte laminate of the present disclosure.

The embodiments of the present disclosure will be described in detail below with reference to the drawings. Note that, the present disclosure is not limited to the following embodiments and various modifications can be made within the scope of the gist of the present disclosure. Furthermore, in the explanation of the drawings, the same components are given the same reference numerals, and duplicate explanations therefor are omitted. The forms shown in the drawings below are examples of the present disclosure and do not limit the present disclosure.

«Solid Electrolyte Laminate»

The solid electrolyte laminate of the present disclosure is: a solid electrolyte laminate, comprising a solid electrolyte and an insulator,
wherein the solid electrolyte laminate has a multi-layer structure comprising a first low-insulator-content solid electrolyte layer, a high-insulator-content solid electrolyte layer, and a second low-insulator-content solid electrolyte layer laminated in this order, and
wherein the content ratio of the insulator in each of the first and the second low-insulator-content solid electrolyte layer is lower than the content ratio of the insulator in the high-insulator-content solid electrolyte layer.

In the solid electrolyte laminate of the present disclosure, when the content ratios of the insulator in the first and the second low-insulator-content solid electrolyte layer and the high-insulator-content solid electrolyte layer are compared with each other, the layer having the highest content ratio is referred to as the "high-insulator-content solid electrolyte layer" and the remaining layers having relatively low content ratios are referred to as the "first low-insulator-content solid electrolyte layer" or the "second low-insulator-content solid electrolyte layer". Furthermore, the content ratio of the insulator in each of the first and the second low-insulator-content solid electrolyte layer means the ratio of the volume of the insulator contained in the first and the second low-insulator-content solid electrolyte layer to the total volume of the solid content (i.e., the materials constituting the first and the second low-insulator-content electrolyte layer, excluding solvent and air) of the first and the second low-insulator-content solid electrolyte layer, respectively. Moreover, the content ratio of the insulator in the high-insulator-content solid electrolyte layer means the ratio of the volume of the insulator contained in the high-insulator-content solid electrolyte layer to the total volume of the solid content (i.e., the materials constituting the high-insulator-content solid electrolyte layer, excluding solvent and air) of the high-insulator-content solid electrolyte layer.

The compositions of the first and the second low-insulator-content solid electrolyte layer and the high-insulator-content solid electrolyte layer may be uniform within each layer or may vary with inclination. Furthermore, as long as the content ratio of the insulator in each of the first and the second low-insulator-content solid electrolyte layer is lower than the content ratio of the insulator in the high-insulator-content solid electrolyte layer, the first and the second low-insulator-content solid electrolyte layer and the high-insulator-content solid electrolyte layer may have the same composition or may have different compositions. The composition of the first low-insulator-content solid electrolyte layer (e.g., the content ratio of the insulator, the type of insulator, the type of solid electrolyte) and the composition of the second low-insulator-content solid electrolyte layer (e.g., the content ratio of the insulator, the type of insulator, the type of solid electrolyte) may be the same or may be different.

As described above, according to the solid electrolyte laminate of the present disclosure, a reduction in the discharge capacity of an all-solid-state battery can be prevented while receiving the benefits of including an insulator such as alumina in the solid electrolyte layer.

Specifically, when, for example, the insulator is less expensive than the solid electrolyte, by including such an insulator in the solid electrolyte laminate, it is possible to reduce the raw material cost of the solid electrolyte laminate while maintaining the thickness of the solid electrolyte laminate necessary to prevent the internal short circuiting of the all-solid-state battery. Furthermore, when, for example, the insulator is alumina particles, by including the alumina particles in the solid electrolyte laminate, as in Patent Literature 2, internal short circuiting of an all-solid-state battery using such a solid electrolyte laminate can be prevented. When the insulator is a binder, by including the binder in the solid electrolyte laminate, the structural stability of the solid electrolyte laminate can be improved.

FIG. 1 is a schematic cross-sectional view showing an embodiment of the solid electrolyte laminate of the present disclosure. The solid electrolyte laminate 10 comprises a solid electrolyte and an insulator. The solid electrolyte laminate 10 has a multi-layer structure comprising a first low-insulator-content solid electrolyte layer L1, a high-insulator-content solid electrolyte layer H1, and a second low-insulator-content electrolyte layer L2, in this order. Hie content ratio of the insulator in each of the first low-insulator-content solid electrolyte layer L1 and the second low-insulator-content solid electrolyte layer L2 is lower than the content ratio of the insulator in the high-insulator-content solid electrolyte layer H1. Note that the content ratio of the first low-insulator-content solid electrolyte layer L1 and the content ratio of the second low-insulator-content solid electrolyte layer may be the same or may be different.

As described above, when the solid electrolyte layer includes an insulator, there are problems such as an increase in overvoltage of the all-solid-state battery and a reduction in the discharge capacity of the all-solid-state battery.

In connection thereto, such an increase in overvoltage was considered to be caused by a reduction in ionic conductivity of the solid electrolyte layer itself along with an increase in the insulator content ratio in the solid electrolyte layer. In other words, it was considered that the insulator contained in the solid electrolyte layer inhibits the conduction of ions, such as lithium ions, in the solid electrolyte layer during charging and discharging, thereby increasing the overvoltage in response to the increase in the content ratio thereof.

However, the inventor of the present disclosure has discovered that this increase in overvoltage when an insulator is included in the solid electrolyte layer is mainly due to a reduction in ionic conductivity at the interface between the solid electrolyte layer and the adjacent active material layer, more specifically, due to a reduction in ionic conductivity at the interface between the solid electrolyte layer and the positive electrode active material layer. In other words, the inventor of the present disclosure has discovered that this increase in overvoltage is mainly generated as a result of the insulator, such as alumina, present in the interface between the solid electrolyte layer and the adjacent active material layer.

Thus, the solid electrolyte laminate of the present disclosure, which was obtained based on such a discovery, has a multi-layer structure comprising a first low-insulator-content solid electrolyte layer, a high-insulator-content solid electrolyte layer, and a second low-insulator-content solid electrolyte layer laminated in this order, and the content ratio of the insulator in each of the first and the second low-insulator-content solid electrolyte layer is lower than the content ratio of the insulator in the high-insulator-content solid electrolyte layer. According to the solid electrolyte laminate of the present disclosure, the ionic conductivity at the interfaces between the low-insulator-content solid electrolyte layers having relatively low insulator content ratio (i.e., the first and the second low-insulator-content solid electrolyte layer) and the active material layers adjacent thereto is improved. As a result, overvoltage of an all-solid-state battery in which such a solid electrolyte laminate is used can be reduced.

Thus, according to the solid electrolyte laminate of the present disclosure, the ionic conductivity at the interfaces between the low-insulator-con tert solid electrolyte layer having relatively low insulator content ratio and the active material layer adjacent thereto is increased as compared with the case in which the same amount of insulator is evenly dispersed in the solid electrolyte laminate. As a result, overvoltage in an all-solid-state battery using such a solid electrolyte laminate can be reduced.

In the present disclosure, the content ratio of the insulator in each of the first and the second low-insulator-content solid electrolyte layer may be 0.9 times or less, 0.8 times or less, 0.7 times or less, 0.6 times or less, 0.5 times or less, 0.4 times or less, 0.3 times or less, 0.2 times or less, or 0.1 times or less and 0.001 times or more, 0.005 times or more, 0.01 times or more, or 0.1 times or more of the content ratio of the insulator in the high-insulator-content solid electrolyte layer.

In the present disclosure, the content ratios of the insulator in the first and the second low-insulator-content solid electrolyte layer in the solid electrolyte laminate are not particularly limited as long as they are lower than the content ratio of the high-insulator-content solid electrolyte layer, and may be 0.1 vol % or more, 0.5 vol % or more, 0.9 vol % or more, 1 vol % or more, or 5 vol % or more, and 50 vol % or less, 40 vol % or less, 30 vol % or less, 20 vol % or less, 15 vol % or less, or 10 vol % or less.

Furthermore, in the present disclosure, the content ratio of the insulator in the high-insulator-content solid electrolyte layer of the solid electrolyte laminate is not particularly limited and may be 0.2 vol % or more, 0.5 vol % or more, 0.9 vol % or more, 1 vol % or more, 5 vol % or more, 10 vol % or more, or 20 vol % or more, and 50 vol % or less, 40 vol % or less, 30 vol % or less, 20 vol % or less, 15 vol % or less, or 10 vol % or less.

The overall thickness of the solid electrolyte laminate and the thicknesses of the first and the second low-insulator-content solid electrolyte layer and the high-insulator-con lent solid electrolyte layer are not particularly limited and can be selected in accordance the desired purpose or application of the all-solid-state battery.

The constituent elements of the solid electrolyte laminate of the present disclosure will be described in detail below.

(Solid Electrolyte Layer)

The solid electrolyte laminate includes a solid electrolyte. The solid electrolyte is not particularly limited and any material commonly used as the solid electrolyte in all-solid-state batteries can be used. For example, a sulfide solid electrolyte or an oxide solid electrolyte can be used as the solid electrolyte. Among these, the solid electrolyte may include a sulfide solid electrolyte in embodiments. Furthermore, the solid electrolyte may be a glass or may be a crystallized glass (glass ceramic).

As examples of the sulfide solid electrolyte, sulfide-based amorphous solid electrolytes, sulfide-based crystalline solid electrolytes, or aldylodyte-based solid electrolytes can be used. However, the sulfide solid electrolyte is not limited to these materials. Specific examples of the sulfide solid electrolyte include $Li_2S$—$P_2S_5$-type compounds (such as $Li_7P_3S_{11}$, $Li_3PS_4$, or $Li_8P_2S_9$), $Li_2S$—$SiS_2$, $LiI$—$Li_2S$—$SiS_2$, $LiI$—$Li_2S$—$P_2S_5$, $LiI$—$LiB$—$Li_2S$—$P_2S_5$, $Li_2S$—$P_2S_5$—$GeS_2$ (such as $Li_{13}GeP_3S_{16}$ or $Li_{10}GeP_2S_{12}$), $LiI$—$Li_2S$—$P_2O_5$, $LiI$—$Li_3PO_4$—$P_2S_5$, $Li_{7-x}PS_{6-x}Cl_x$, or combinations thereof. However, the sulfide solid electrolyte is not limited to these materials.

Examples of the oxide solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, or $Li_{3+x}PO_{4-x}N_x$ (LiPON). However, the oxide solid electrolyte is not limited to these materials.

<Insulator>

The solid electrolyte laminate of the present disclosure comprises an insulator.

The insulator included in the solid electrolyte laminate of the present disclosure is not particularly limited and any known material which can be used in all-solid-state batteries can be used. As the insulator, materials which are insulative to lithium such as lithium ions, the conduction of which to the solid electrolyte is necessary for the battery reaction, such as an inorganic material, an organic material, or mixtures thereof can be used.

As the inorganic material, inorganic particles, in particular metal oxide particles such as iron oxide, silica ($SiO_2$), alumina ($Al_2O_3$), $TiO_2$, or $BaTiO_3$; particles of an inorganic nitride such as aluminum nitride or silicon nitride; particles of a poorly soluble ionic crystal such as calcium fluoride, barium fluoride, barium sulfate or the like; particles of a covalent crystal such as silicon or diamond; or clay particles such as montmorillonite, can be used. Furthermore, as the inorganic material, an inorganic binder, for example, a silica derived from silica sol, can be used.

As the organic material, an organic binder, in particular, a rubber-type binder such as polyvinylidene fluoride (PVdF), carboxy methylcellulose (CMC), butadiene rubber (BR), or styrene butadiene rubber (SBR), can be used.

«All-Solid-State Battery»

The present disclosure can provide an all-solid-state battery comprising a solid electrolyte laminate including an insulator as described above.

The all-solid-state battery of the present disclosure includes one or more all-solid-state unit cells in which a positive electrode current collector layer, a positive electrode active material layer, the solid electrolyte laminate of the present disclosure, a negative electrode active material layer, and a negative electrode current collector layer are laminated in this order.

Figure 2:
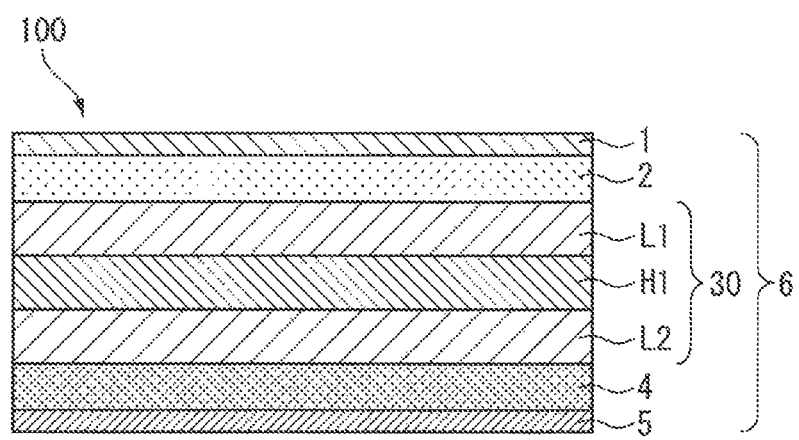
FIG. 2 is a schematic cross-sectional view showing an embodiment of the solid electrolyte laminate of the present disclosure.

FIG. 2 is a schematic cross-sectional view showing an embodiment of the all-solid-state battery of the present disclosure. In FIG. 2, the all-solid-state battery 100 can comprise a unit all-solid-state cell 6 comprising a positive electrode current collector layer 1, a positive electrode active material layer 2, the first low-insulator-content solid electrolyte layer L1 of the solid electrolyte laminate 30, the high-insulator-content solid electrolyte layer H1 of the solid electrolyte laminate 30, the second low-insulator-content solid electrolyte layer L2 of the solid electrolyte 30, a negative electrode active material layer 4, and a negative electrode current collector layer 5 laminated in this order. Note that, though the all-solid-slate battery 100 shown in FIG. 2 includes only one all-solid-state unit cell 6, in accordance with the intended usage or application thereof, the all-solid-state battery of the present disclosure may include two or more all-solid-state unit cells.

The form of the all-solid-state battery of the present disclosure is not particularly limited, and can be, for example, a coin type, laminate type (pouch type), cylindrical type, square type, or the like.

In the present disclosure, the type of the all-solid-state battery can be an all-solid-state lithium ion battery, an all-solid-state sodium ion battery, an all-solid-state magnesium ion battery, or an all-solid-state calcium ion battery. Among these, the type of the all-solid-state battery may be an all-solid-state lithium ion battery or an all-solid-state sodium ion battery in embodiments. The type of the all-solid-state battery may be an all-solid-state lithium ion battery in embodiments. Furthermore, the all-solid-state battery may be a primary battery or may be a secondary battery. Among these, the all-solid-state battery may be a secondary battery in embodiments.

In other words, the all-solid-slate battery of the present disclosure may be a lithium ion secondary battery in embodiments.

A positive electrode current collector layer, a positive electrode active material layer, a negative electrode active material layer, and a negative electrode current collector layer will be described below as an example of a lithium ion secondary battery, which may be an embodiment of the all-solid-state battery of the present disclosure. Note that the solid electrolyte laminate is as described above, and thus, an explanation therefor has been omitted.

<Positive Electrode Current Collector Layer>

The conductive material used in the positive electrode current collector layer is not particularly limited and any known conductive material which can be used in all-solid-state batteries can be suitably used. For example, the conductive material used in the positive electrode current collector layer may be SUS, aluminum, copper, nickel, iron, titanium, carbon, or the like. However, the conductive material is not limited thereto.

The form of the positive electrode current collector layer of the present disclosure is not particularly limited, and can be, for example, a foil, a plate, a mesh, or the like, from among these, the positive electrode current collector layer may be a foil in embodiments.

<Positive Electrode Active Material Layer>

The positive electrode active material layer includes a positive electrode active material. Furthermore, the positive electrode active material layer can further include the solid electrolyte described above. In addition thereto, additives which are used in the positive electrode active material layer of an all-solid-state battery, such as a conductive aid or a binder, can be included in accordance with the intended use or application thereof.

(Positive Electrode Active Material)

The material of the positive electrode active material used in the present disclosure is not particularly limited and any known material can be used. For example, the positive electrode active material may be lithium cobalt oxide (LiCoO$_2$), lithium nickel oxide (LiNiO$_2$), lithium manganate (LiMn$_2$O$_4$), LiNi$_{1/3}$Co$_{1/3}$O$_2$ or a heterogeneous-element-substituted Li—Mn spinel represented by Li$_{1+x}$Mn$_{2-x-y}$M$_y$O$_4$ (wherein M is at least one metal element selected from Al, Mg, Co, Fe, Ni and Zn). However, the material of the positive electrode active material layer is not limited thereto.

(Conductive Aid)

The conductive aid is not particularly limited and a known conductive aid can be used. For example, the conductive aid may be acetylene black, Ketjen black, graphite, carbon fiber (for example, vapor grown carbon fiber (VGCF)), or a metal material. However, the conductive aid is not limited thereto.

(Binder)

The binder is not particularly limited and a known binder can be used. For example, the binder may be a rubber-type binder material such as polyvinylidene fluoride (PVdF), carboxy methylcellulose (CMC), butadiene rubber (BR), styrene butadiene rubber (SBR), or combinations thereof. However, the binder is not limited thereto.

<Negative Electrode Active Material Layer>

The negative electrode active material layer includes a negative electrode active material. The negative electrode active material layer can further include the solid electrolyte described above. In addition thereto, additives which are used in the negative electrode active material layer of all-solid-state batteries, such as a conductive aid or binder, can be included in accordance with the intended use or application thereof.

(Negative Electrode Active Material)

The material of the negative electrode active material used in the present disclosure is not particularly limited and, in embodiments, may be capable of occluding and releasing metal ions such as lithium ions. For example, the negative electrode active material may be a metal such as Li, Sn, Si, or In, an oxide such as Li$_4$Ti$_5$O$_{12}$, or a carbon material such as a hard carbon, a soft carbon, or graphite. However, the material of the negative electrode active material layer is not limited thereto.

Regarding the solid electrolyte and other additives such as the conductive aid and binder used in the negative electrode active material layer, those described above in the sections "positive electrode active material layer" and "solid electrolyte layer" can be appropriately used.

<Negative Electrode Current Collector Layer>

The conductive material used in the negative electrode current collector layer is not particularly limited and any known conductive material which can be used in an all-solid-state battery can be suitably used. For example, the conductive material used in the negative electrode current collector layer may be SUS, aluminum, copper, nickel, iron, titanium, carbon, or the like. However, the conductive material is not limited thereto.

EXAMPLES

The Examples of the present disclosure are shown below. Note that the following Examples are for further explanation and the present disclosure is not limited thereby.

Example 1

Figure 3:
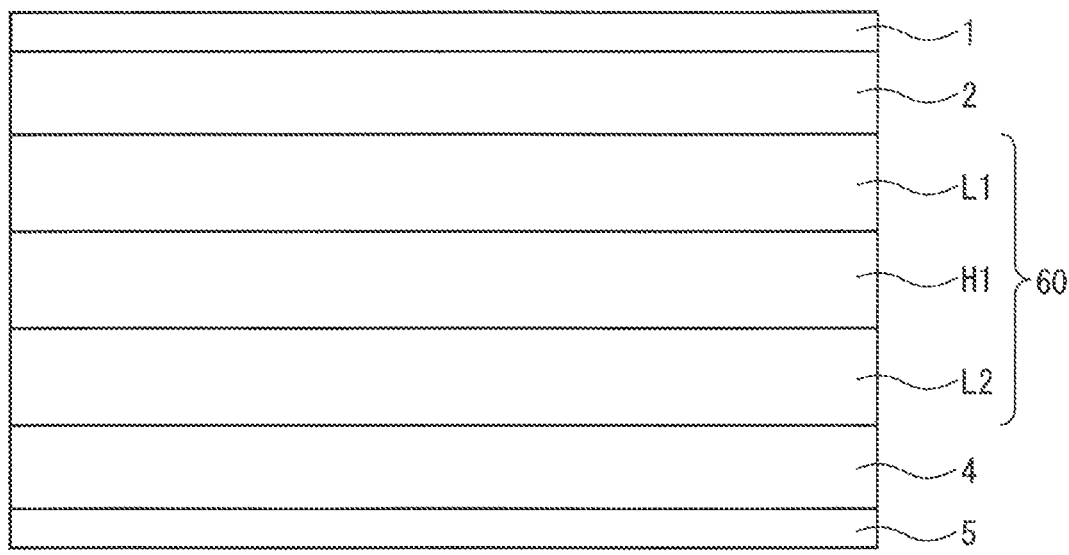
FIG. 3 is a schematic view showing the configuration of the all-solid-state battery of Example 1.

In Example 1, an all-solid-state battery having the laminate structure shown in FIG. 3 was produced. In other words, an all-solid-state battery in which a positive electrode current collector layer, a positive electrode active material layer, a first low-insulator-content solid electrolyte layer, a high-insulator-content solid electrolyte layer, a second low-insulator-content solid electrolyte layer, a negative electrode active material layer, and a negative electrode current collector layer are laminated in this order was produced. This laminate structure is shown in Table 1 below. Details of each of the layers of this all-solid-state battery are as described below.

An aluminum foil was used as the positive electrode current collector layer 1.

The positive electrode active material layer 2 included a positive electrode active material layer ($LiNi_{1/3}Co_{1/3}Mn_{1/3}O_2$), a sulfide solid electrolyte (a solid electrolyte composed primarily of $Li_7P_3S_{11}$), a binder (PVdF), and a conductive aid (VGCF).

The solid electrolyte laminate 60 was produced with a multi-layer structure in which a first low-insulator-content solid electrolyte layer, a high-insulator-content solid electrolyte layer, and a second low-insulator-content solid electrolyte layer were laminated in this order.

The first and the second low-insulator-content solid electrolyte layer each included a sulfide solid electrolyte (a solid electrolyte composed primarily of $Li_7P_3S_{11}$), and a binder (PVdF) as an insulator. The content ratios of the binder in the first and the second low-insulator-content solid electrolyte layer were 1 vol %, respectively, and the content ratio of the sulfide solid electrolyte was 99.0 vol %.

The high-insulator-content solid electrolyte layer included alumina ($\alpha$-$Al_2O_3$) as an insulator. The content ratio of binder therein was 1 vol %, the content ratio of alumina was 49.5%, and the content ratio of sulfide solid electrolyte was 49.5 vol %. All other details were the same as those of the low-insulator-content solid electrode layers.

The negative electrode active material layer 4 included a negative electrode active material (Si), a sulfide solid electrolyte (a solid electrolyte composed primarily of $Li_7P_3S_{11}$), a binder (PVdF), and a conductive aid (VGCF).

A copper foil was used as the negative electrode current collector layer 5.

Comparative Example 1

In Comparative Example 1, an all-solid-state battery was produced in the same manner as in Example 1 except that the laminate structure of the solid electrolyte laminate was changed. Specifically, in Comparative Example 1, an all-solid-state battery was produced in the same manner as in Example 1 except that the solid electrolyte laminate included a first low-insulator-content solid electrolyte layer, a second low-insulator-content solid electrolyte layer, and a high-insulator-content solid electrolyte layer in this order. This laminate structure is shown in Table 1 below.

Comparative Example 2

In Comparative Example 2, an all-solid-state battery was produced in the same manner as in Example 1 except that the laminate structure of the solid electrolyte laminate was changed. Specifically, in Comparative Example 2, an all-solid-state battery was produced in the same manner as in Example 1 except that the solid electrolyte laminate included a high-insulator-content solid electrolyte layer, a first low-insulator-content solid electrolyte layer, and a second low-insulator-content solid electrolyte layer in this order. This laminate structure is shown in Table 1 below.

Comparative Example 3

In Comparative Example 3, an all-solid-state battery was produced in the same manner as in Example 1 except that the laminate structure of the solid electrolyte laminate was changed. Specifically, in Comparative Example 3, an all-solid-state battery was produced in the same manner as in Example 1 except that the solid electrolyte laminate included three first low-insulator-content solid electrolyte layers. This laminate structure is shown in Table 1 below.

Comparative Example 4

In Comparative Example 4, an all-solid-state battery was produced in the same manner as in Example 1 except that the laminate structure of the solid electrolyte laminate was changed. Specifically, in Comparative Example 4, an all-solid-state battery was produced in the same manner as in Example 1 except that the solid electrolyte laminate included three high-insulator-content solid electrolyte layers. This laminate structure is shown in Table 1 below.

<Evaluation>

For each of the all-solid-state batteries of the Example and Comparative Examples, the battery was charged at a constant current at 0.1 C until the voltage reached 4.55 V, and thereafter, charging was performed at a constant voltage until the current readied 0.01 C. Constant current discharge was then performed at 1 C until the voltage reached 3.0 V. The discharge capacity of each all-solid-state battery at a 1 C constant current discharge was measured. The results are shown in Table 1. Table 1 also summarizes the ratios of the amounts of solid electrolyte in the solid electrolyte laminate of each of the all-solid-state batteries of the Example and the Comparative Examples.

TABLE 1

| | Layer Order | Discharge Capacity*[4] | Amount of Solid Electrolyte in Solid Electrolyte Laminate*[5] |
|---|---|---|---|
| Example 1 | Positive Electrolyte Current Collector Layer/Positive Electrode Active Material Layer/ (First Low-Insulator-Content Solid Electrolyte Layer*[1]/High-Insulator-Content Solid Electrolyte Layer*[2]/Second Low-Insulator Content Solid Electrolyte Layer*[3])/Negative Electrode Active Material Layer/Negative Electrode Current Collector Layer | 100% | 82.5% |
| Comparative Example 1 | Positive Electrolyte Current Collector Layer/Positive Electrode Active Material Layer/ (First Low-Insulator-Content Solid Electrolyte Layer/Second Low-Insulator Content Solid Electrolyte Layer/High-Insulator-Content Solid Electrolyte Layer)/Negative Electrode Active Material Layer/Negative Electrode Current Collector Layer | 97.9% | 82.5% |
| Comparative Example 2 | Positive Electrolyte Current Collector Layer/Positive Electrode Active Material Layer/ (High-Insulator-Content Solid Electrolyte Layer/First Low-Insulator-Content Solid Electrolyte Layer/Second Low-Insulator Content Solid Electrolyte Layer)/Negative Electrode Active Material Layer/Negative Electrode Current Collector Layer | 96.6% | 82.5% |

TABLE 1-continued

| | Layer Order | Discharge Capacity[*4] | Amount of Solid Electrolyte in Solid Electrolyte Laminate[*5] |
|---|---|---|---|
| Comparative Example 3 | Positive Electrolyte Current Collector Layer/Positive Electrode Active Material Layer/(First Low-Insulator-Content Solid Electrolyte Layer/First Low-Insulator-Content Solid Electrolyte Layer/First Low-Insulator-Content Solid Electrolyte Layer)/Negative Electrode Active Material Layer/Negative Electrode Current Collector Layer | 100% | 100% |
| Comparative Example 4 | Positive Electrolyte Current Collector Layer/Positive Electrode Active Material Layer/(High-Insulator-Content Solid Electrolyte Layer/High-Insulator-Content Solid Electrolyte Layer/High-Insulator-Content Solid Electrolyte Layer)/Negative Electrode Active Material Layer/Negative Electrode Current Collector Layer | 95% | 50% |

First Low-Insulator-Content Solid Electrolyte Layer[*1]: Alumina Content Ratio 0 vol %
High-Insulator-Content Solid Electrolyte Layer[*2]: Alumina Content Ratio 49.5 vol %
Second Low-Insulator Content Solid Electrolyte Layer[*3]: Alumina Content Ratio 0 vol %
Discharge Capacity[*4]: As Compared to Comparative Example 3 as "100%"
Amount of Solid Electrolyte in Solid Electrolyte Laminate[*5]: As Compared to Comparative Example 3 as "100%"

As can be understood from Table 1, in the all-solid-state battery of Example 1, the solid electrolyte laminated included alumina as an insulator and a binder, and as a result, though the amount of solid electrolyte in the solid electrolyte laminate was lower than in the all-solid-state battery of Comparative Example 3, the discharge capacity thereof was identical to or close to that of the all-solid-state battery of Comparative Example 3.

Note that in Example 1 and the Comparative Examples described above, cases in which the insulator was primarily alumina were evaluated, but it is considered that the same effect can be obtained when the insulator is primarily a binder.

REFERENCE SIGNS LIST 1 positive electrode current collector layer
2 positive electrode active material layer
4 negative electrode active material layer
5 negative electrode current collector layer
6 all-solid state unit cell
10, 30 solid electrolyte laminate
100 all-solid-state battery
L1 first low-insulator-content solid electrolyte layer
L2 second low-insulator-content solid electrolyte layer
H1 high-insulator-content solid electrolyte layer

The invention claimed is:

1. A solid electrolyte laminate, comprising a solid electrolyte and an insulator, wherein the solid electrolyte laminate has a multi-layer structure comprising a first low-insulator-content solid electrolyte layer, a high-insulator-content solid electrolyte layer, and a second low-insulator-content solid electrolyte layer laminated in this order, and wherein the content ratio of the insulator in each of the first and the second low-insulator-content solid electrolyte layer is 10 vol % or less and the content ratio of the insulator in the high-insulator-content solid electrolyte layer is 20 vol % or more.

2. The solid electrolyte laminate according to claim 1, wherein the content ratio of the insulator in each of the first and the second low-insulator-content solid electrolyte layer is 0.9 times or less of the content ratio of the insulator in the high-insulator-content solid electrolyte layer.

3. The solid electrolyte laminate according to claim 1, wherein the insulator comprises metal oxide particles.

4. The solid electrolyte laminate according to claim 3, wherein the metal oxide particles are alumina particles.

5. The solid electrolyte laminate according to claim 1, wherein the insulator comprises a binder.

6. The solid electrolyte laminate according to claim 1, wherein the solid electrolyte comprises a sulfide solid electrolyte.

7. An all-solid-state battery, comprising one or more all-solid state unit cells in which a positive electrode current collector layer, a positive electrode active material layer, the solid electrolyte laminate according to claim 1, a negative electrode active material layer, and a negative electrode current collector layer are laminated in this order.

8. The all-solid-slate battery according to claim 7, wherein the all-solid-state battery is a lithium ion secondary battery.

* * * * *

UNITED STATES PATENT AND TRADEMARK OFFICE
CERTIFICATE OF CORRECTION

PATENT NO. : 10,840,548 B2  
APPLICATION NO. : 16/372538  
DATED : November 17, 2020  
INVENTOR(S) : Yoshitaka Minamida Page 1 of 1

It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (72), inventor 1, city, delete "Susono" and insert --Susono-shi Shizuoka-ken--, therefor.

Item (73), assignee 1, city, delete "Toyota" and insert --Toyota-shi Aichi-ken--, therefor.

In the Specification

In Column 1, Line(s) 58, after "laminate", insert --,--.

In Column 2, Line(s) 41, delete "winch" and insert --which--, therefor.

In Column 4, Line(s) 36, delete "Hie" and insert --The--, therefor.

In Column 5, Line(s) 24, delete "con tert" and insert --content--, therefor.

In Column 5, Line(s) 59-60, delete "con lent" and insert --content--, therefor.

In Column 7, Line(s) 49, delete "like, from" and insert --like. From--, therefor.

In Column 7, Line(s) 67, delete "LiNi$_{1/3}$Co$_{1/3}$O$_2$" and insert --LiNi$_{1/3}$Co$_{1/3}$Mn$_{1/3}$O$_2$--, therefor.

In Column 8, Line(s) 2, delete "al least" and insert --at least--, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*